United States Patent [19]

Rosenfeld

[11] Patent Number: 4,527,824

[45] Date of Patent: Jul. 9, 1985

[54] VACUUM CANE FOR PICKING UP ARTICLES OFF THE FLOOR

[76] Inventor: Paul Rosenfeld, 147-15 258th St., Rosedale, N.Y. 11422

[21] Appl. No.: 628,624

[22] Filed: Jul. 6, 1984

[51] Int. Cl.[3] .............................................. B25J 15/06

[52] U.S. Cl. ..................................... 294/64.1; 135/66; 294/19.1

[58] Field of Search ..................... 294/19 R, 64 R, 65, 294/65.5; 15/341, 344, DIG. 1; 135/65, 66, DIG. 11

[56] References Cited

U.S. PATENT DOCUMENTS

| | | | |
|---|---|---|---|
| 2,355,322 | 8/1944 | Nuffer et al. | 15/344 |
| 2,384,334 | 9/1945 | Olson | 294/64 R |
| 2,665,445 | 1/1954 | Foerstel et al. | 15/344 |
| 2,983,541 | 5/1961 | Maki | 294/64 R |
| 3,294,434 | 12/1966 | Sinn | 294/64 R |

*Primary Examiner*—Johnny D. Cherry
*Attorney, Agent, or Firm*—Michael I. Kroll

[57] ABSTRACT

A vacuum cane for picking up articles off the floor is provided and consists of a hollow cylindrical cane-shaped housing having a curved hand grip, an electric fan affixed vertically within the housing near the hand grip to provide suction for the vacuum cane, a battery within the housing to supply power to the electric fan and an inverted cup affixed to bottom of the housing. The cup creates a seal around its periphery so that a vacuum is created applying suction of a small area to a large area when placed against the article to be picked up off the floor.

5 Claims, 4 Drawing Figures

VACUUM CANE FOR PICKING UP ARTICLES OFF THE FLOOR

BACKGROUND OF THE INVENTION

1. Field of Invention

The instant invention relates generally to suction devices and more specifically it relates to a vacuum cane for picking up articles off the floor.

2. Description of the Prior Art

Numerous suction devices such as vacuum cleaners have been provided in prior art that are adapted to suck up different types of small particles like dust and dirt for disposal. While these prior art units may be suitable for the particular purpose to which they address, they would not be suitable for the purposes of the present invention as heretofore described.

SUMMARY OF THE INVENTION

A principle object of the present invention is to provide a vacuum cane for picking up articles off the floor so that a person does not have to bend down to manually pick up an article dropped on the floor.

Another object is to provide a vacuum cane for picking up articles off the floor that is lightweight and can be manipulated by one hand of the user.

An additional object is to provide a vacuum cane for picking up articles off the floor that can be placed in a holder and battery charger plugged into a wall receptacle to recharge a battery in the vacuum cane when the vacuum cane is not being used.

A further object is to provide a vacuum cane for picking up articles off the floor that is simple and easy to use.

A still further object is to provide a vacuum cane for picking up articles off the floor that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
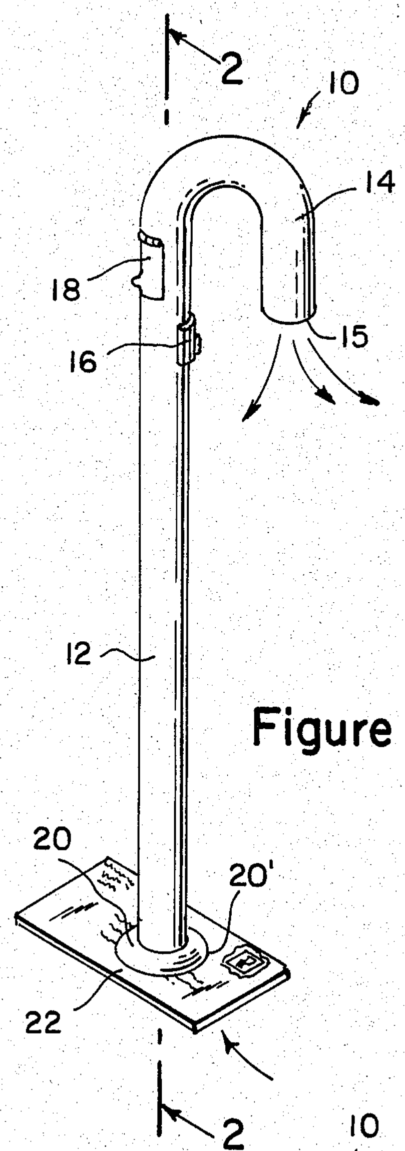
FIG. 1 is a perspective view of the invention.
Figure 2:
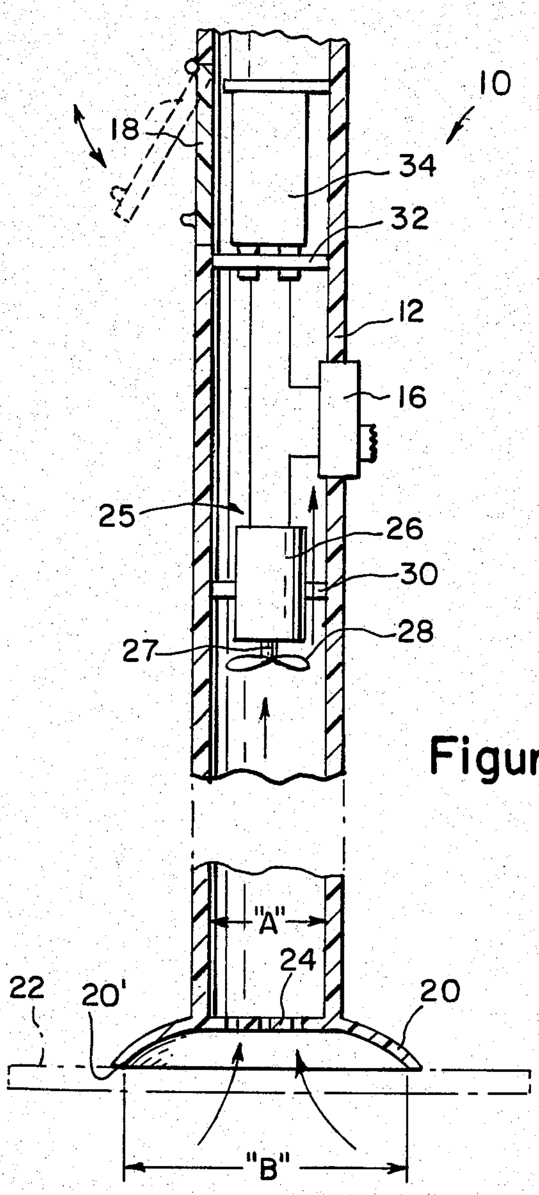
FIG. 2 is an enlarged cross sectional view with parts broken away taken along line 2—2 in FIG. 1.

Turning now descriptively to the drawings, in which similar reference characters denote similar elements throughout the several views, FIGS. 1 and 2 illustrates a vacuum cane 10 for picking up articles 22 off the floor. The articles 22 are lightweight objects such as letters, envelopes, pieces of paper, crockery, silverware, etc. The vacuum cane 10 consists of a hollow cylindrical cane-shaped housing 12, an electric fan 25, at least one battery 34 and an inverted cup 20.

The hollow cylindrical cane-shaped housing 12 has a curved hand grip 14 at top. The housing 12 also has a perforated inlet port 24 at bottom and a perforated outlet port 15 at end of the curved hand grip 14. The electric fan 25 is affixed vertically within the housing 12 near the hand grip 14 to provide suction for the vacuum cane 10. The battery 34 is affixed within the housing 12 on a contact plate 32 near the electric fan 25 to supply power to the electric fan. The inverted cup 20 is affixed around bottom circumference of the perforated inlet port 24 of the housing 12. Cup 20 creates a seal around its periphery 20' so that a vacuum is created applying suction of small area "A" to large area "B" when placed against the article 22. This will result in the vacuum cane 10 being able to apply a larger force on the article 22 thus allowing heavier weighted articles to be picked up off the floor. Also the bigger cup 20 is the more off center the article 22 can be in relation to the cap.

The electric fan 35 consists of an electric motor 26, a brace 30, a plurality of fan blades 28 and a switch 16. The electric motor 26 has a shaft 27 with the brace 30 mounting the electric motor 26 to the housing 12. The fan blades 28 are affixed to the shaft 27 to suck up air through the perforated inlet port 24 past the brace 30 and electric motor 26 and out through the outlet port 15. The switch 16 is electrically connected between the electric motor 26 and the battery 34 to turn the electric motor on and off. The switch 16 is placed on the housing 12 near the hand grip 14 to be activated by a finger of a hand holding the hand grip.

A hinged door 18 is also provided and is mounted to the housing 12 near the hand grip 14 for access to the battery 34 within the housing for replacement thereof.

Figure 3:
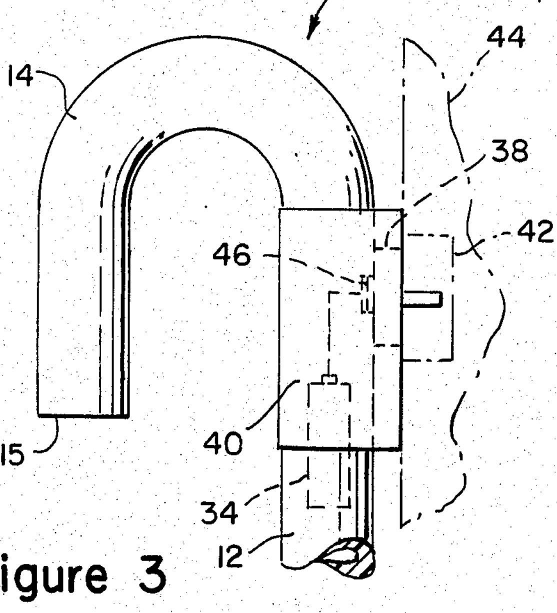
FIG. 3 is a partial side view of the invention attached to a holder with a battery charger supported on a wall.
Figure 4:
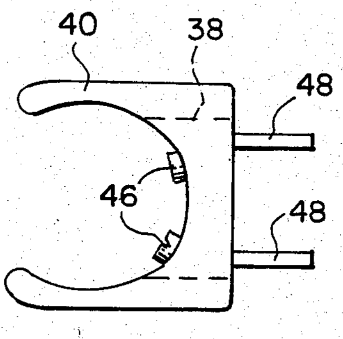
FIG. 4 is a top view of just the holder with the battery charger.

FIGS. 3 and 4 show a holder 40 for supporting the vacuum cane 10 to a wall 44 when the vacuum cane is not being used. The holder 40 further contains a battery charger 38 that has a pair of contacts 46, 46 and a pair of prongs 48, 48. The contacts 46, 46 are electrically connected to terminals of the battery 34 within the housing 12 while the prongs 48, 48 are plugged into a wall receptacle 42 to recharge the battery 34 when the vacuum cane 10 is not being used.

The housing 12, hand grip 14 and cup 20 of the vacuum cane 10 with holder 40 can be fabricated from strong plastic or other durable materials that will last for a long period of time under constant use.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A vacuum cane for picking up articles off the floor which comprises:

(a) a hollow cylindrical cane-shaped housing having a curved hand grip at top, said housing having a perforated inlet port at bottom and a perforated outlet port at end of said curved hand grip;

(b) an electric fan affixed vertically within said housing near said hand grip to provide suction for said vacuum cane;

(c) at least one battery affixed within said housing near said electric fan to supply power to said electric fan; and (d) an inverted cup affixed around bottom circumference of said perforated inlet port of said housing, said cup creates a seal around its periphery so that a vacuum is created applying suction of a small area to a large area when placed against said article which will result in said vacuum cane being able to apply a larger force on said article thus allowing heavier weighted articles to be picked up off the floor.

2. A vacuum cane for picking up articles off the floor as recited in claim 1, wherein said electric fan comprises:

(a) an electric motor having a shaft;
(b) a brace mounting said electric motor to said housing;
(c) a plurality of fan blades affixed to said shaft to suck up air through said perforated inlet port past said brace and electric motor and out through said outlet port; and
(d) a switch electrically connected between said electric motor and said battery to turn said electric motor on and off, said switch placed on said housing near said hand grip to be activated by a finger of a hand holding said hand grip.

3. A vacuum cane for picking up articles off the floor as recited in claim 2, further comprising a hinged door mounted to said housing near said hand grip for access to said battery within said housing for replacement thereof.

4. A vacuum cane for picking up articles off the floor as recited in claim 3, further comprising a holder for supporting said vacuum cane to a wall when said vacuum cane is not being used.

5. A vacuum cane for picking up articles off the floor as recited in claim 3, wherein said holder further comprises a battery charger having a pair of contacts and a pair of prongs, said contacts are electrically connected to terminals of said battery within said housing while said prongs are plugged into a wall receptacle to recharge said battery when said vacuum cane is not being used.

* * * * *